United States Patent [19]
Miller

[11] 4,071,904
[45] Jan. 31, 1978

[54] CURRENT MODE MULTIPLE-GENERATING REGISTER

[75] Inventor: Homer Warner Miller, Peoria, Ariz.

[73] Assignee: Honeywell Information Systems Inc., Phoenix, Ariz.

[21] Appl. No.: 756,465

[22] Filed: Jan. 3, 1977

[51] Int. Cl.² ............................................ G06F 7/52
[52] U.S. Cl. ................................................ 364/757
[58] Field of Search ........................................ 235/164

[56] References Cited

U.S. PATENT DOCUMENTS 3,949,209  4/1976  Fett ...................................... 235/164

*Primary Examiner*—Jerry Smith
*Attorney, Agent, or Firm*—Walter W. Nielsen; William W. Holloway, Jr.

[57] ABSTRACT

A multiple-generating register generates one of several possible multiples of a binary number which is input thereto depending upon the informational content of a 3-bit control signal. For each data stage there exists a data selector circuit, a master/slave circuit, and an output buffer circuit. The device can be configured as an inverting shift register for test and diagnostic purposes. The device is implemented in current mode logic, and a portion of the circuitry operates on differential level signals for increased operational speed and efficiency.

6 Claims, 27 Drawing Figures

CURRENT MODE MULTIPLE-GENERATING REGISTER

CROSS-REFERENCE TO RELATED INVENTIONS

1. Current Mode Carry Look Ahead Array invented by Homer W. Miller, now issued as U.S. Pat. No. 3,925,652 and assigned to the same assignee as the instant invention.

2. Magnitude Comparison Circuit invented by Homer W. Miller, now issued as U.S. Pat. No. 3,955,177 and assigned to the same assignee as the instant invention.

3. Current Mode Arithmetic Logic Array invented by Homer W. Miller, now issued as U.S. Pat. No. 3,925,651 and assigned to the same assignee as the instant invention.

4. Current Mode Binary (BCD) Arithmetic Array invented by Homer W. Miller, now issued as U.S. Pat. No. 3,958,112 and assigned to the same assignee as the instant invention.

5. Data Alignment Circuit invented by Darrell L. Fett, now issued as U.S. Pat. No. 3,967,101 and assigned to the same assignee as the instant invention.

6. Selector Latch Gate invented by Darrell L. Fett, now issued as U.S. Pat. No. 3,953,746 and assigned to the same assignee as the instant invention.

7. N-Bit Register System Using CML Circuits invented by Darrell L. Fett, now issued as U.S. Pat. No. 3,984,702 and assigned to the same assignee as the instant invention.

8. High-Speed Random Access Memory invented by Darrell L. Fett, now issued as U.S. Pat. No. 3,916,394 and assigned to the same assignee as the instant invention.

9. Multiple-Generating Register invented by Darrell L. Fett, now issued as U.S. Pat. No. 3,949,209 and assigned to the same assignee as the instant invention.

10. Multiple-Generating Register invented by Jerome L. Kindell, bearing Ser. No. 642,845, filed Dec. 22, 1975, now U.S. Pat. No. 4,034,198 and assigned to the same assignee as the instant invention.

11. Current Mode Arithmetic Logic Circuit With Parity Prediction and Checking invented by Homer W. Miller bearing Ser. No. 756,457, filed Jan. 3, 1977, and assigned to the same assignee as the instant invention.

12. Current Mode 5-Bit Arithmetic Logic Unit With Parity invented by Homer W. Miller bearing Ser. No. 756,456, filed Jan. 3, 1977, and assigned to the same assignee as the instant invention.

13. Current Mode Multiple-Generating Register invented by Homer W. Miller bearing Ser. No. 756,465, filed Jan. 3, 1977, and assigned to the same assignee as the instant invention.

14. Current Mode Simultaneous Dual-Read/Single-Write Memory Device invented by Darrell L. Fett bearing Ser. No. 756,466, filed Jan. 3, 1977, and assigned to the same assignee as the instant invention.

15. Current Mode 4-Bit Arithmetic Logic Unit With Parity invented by Homer W. Miller bearing Ser. No. 756,458, filed Jan. 3, 1977, and assigned to the same assignee as the instant invention.

16. Current Mode Binary/Decimal Arithmetic Logic Unit With Parity invented by Homer W. Miller bearing Ser. No. 756,460, filed Jan. 3, 1977, and assigned to the same assignee as the instant invention.

17. 5-Bit 1-of-4 Gated Select Circuit Utilizing Current Mode Logic invented by Homer W. Miller bearing Ser. No. 756,464, filed Jan. 3, 1977, and assigned to the same assignee as the instant invnention.

18. 17-Bit Equality Comparator Utilizing Current Mode Logic invented by Homer W. Miller bearing Ser. No. 756,459, filed Jan. 3, 1977, and assigned to the same assignee as the instant invention.

19. J-K Flip-Flop Utilizing Current Mode Logic With Non-Functional Test Capability invented by Homer W. Miller bearing Ser. No. 756,461, filed Jan. 3, 1977, and assigned to the same assignee as the instant invention.

20. 4-Bit Counter/Shift Register Utilizing Current Mode Logic invented by Homer W. Miller bearing Ser. No. 756,463, filed Jan. 3, 1977, and assigned to the same assignee as the instant invention.

21. 10-Bit D-Type Register Utilizing Current Mode Logic invented by Homer W. Miller bearing Ser. No. 756,462, filed Jan. 3, 1977, and assigned to the same assignee as the instant invention.

BACKGROUND OF THE INVENTION

This invention relates generally to digital registers and, in particular, to a current mode multiple-generating register for generating one of several possible multiples of a binary number which is input thereto.

In the digital computer art it is often necessary to generate one of several possible multiples of a given binary number for a particular purpose. The present invention has utility, for example, in a high speed binary multiplier circuit which performs multiplication by means of an algorithm requiring the formation of partial products of the given multiplicand as a function of the given multiplier. The partial products are formed by generating multiples of $\pm 1$, $\pm 2$, or a 0 times the given multiplicand, depending upon the given multiplier, and summing those multiples into the partial products. The present invention also has utility in divider and data-shaping circuits and in other digital circuits employed in the processing of data in binary form, as will be apparent to one skilled in the art.

Related Invention Nos. 9 and 10 referenced above disclose multiple-generating registers. The present invention is directed to an improved multiple-generating register wherein such register may be operated at higher speeds and may be reconfigured for testing and diagnostic purposes.

SUMMARY OF THE INVENTION

It is an object of the present invention to provide an improved current mode multiple-generating register.

It is also an object of the present invention to provide an improved current mode multiple-generating register which utilizes in part differential mode logic to increase the speed and efficiency of operation.

It is yet another object of the present invention to provide an improved current mode multiple-generating register which can be configured as an inverting shift register for test and diagnostic purposes.

These and other objects of the invention are achieved in accordance with a preferred embodiment of the invention by providing an improved current mode multiple-generating register comprising a control circuit, a clock circuit, and a plurality of master/slave circuits, each of which master/slave circuits is responsive to a data selector circuit and generates an output through an output buffer circuit. The control circuit is responsive to a 3-bit control signal and generates a particular one of several possible multiple-generating commands representing, respectively, a desired output binary number of ±1, ±2 or 0 times the given input binary number. The individual data selector circuits are responsive to the given input binary number and also to the particular multiple-generating command, and they together generate the particular multiple associated with such command and pass such multiple along to the master/slave circuits. The master/slave circuits are responsive to the particular binary multiple which has been generated and to the output of the clock circuit, and at a certain portion in the clock cycle the desired multiple appears at the output of the data buffer circuits.

Additional circuitry is provided which configures the device as a 13-bit shift register with inversion between each bit. Input to the first bit is provided over a special input line, and output from the last bit of the shift register appears on a special output line. Using this configuration, the multiple-generating register may be tested for proper operation.

The improved multiple-generating register of the present invention utilizes in a portion of the circuitry thereof differential mode logic to decrease power consumption and increase operational speed.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

FIGS. 2a–13a show various logic symbols appearing in FIGS. 1A–1C;

FIGS. 2b–13b show detailed circuit schematics corresponding to the logic symbols shown in FIGS 2a–13a.

DETAILED DESCRIPTION OF THE INVENTION

Figure 1A:
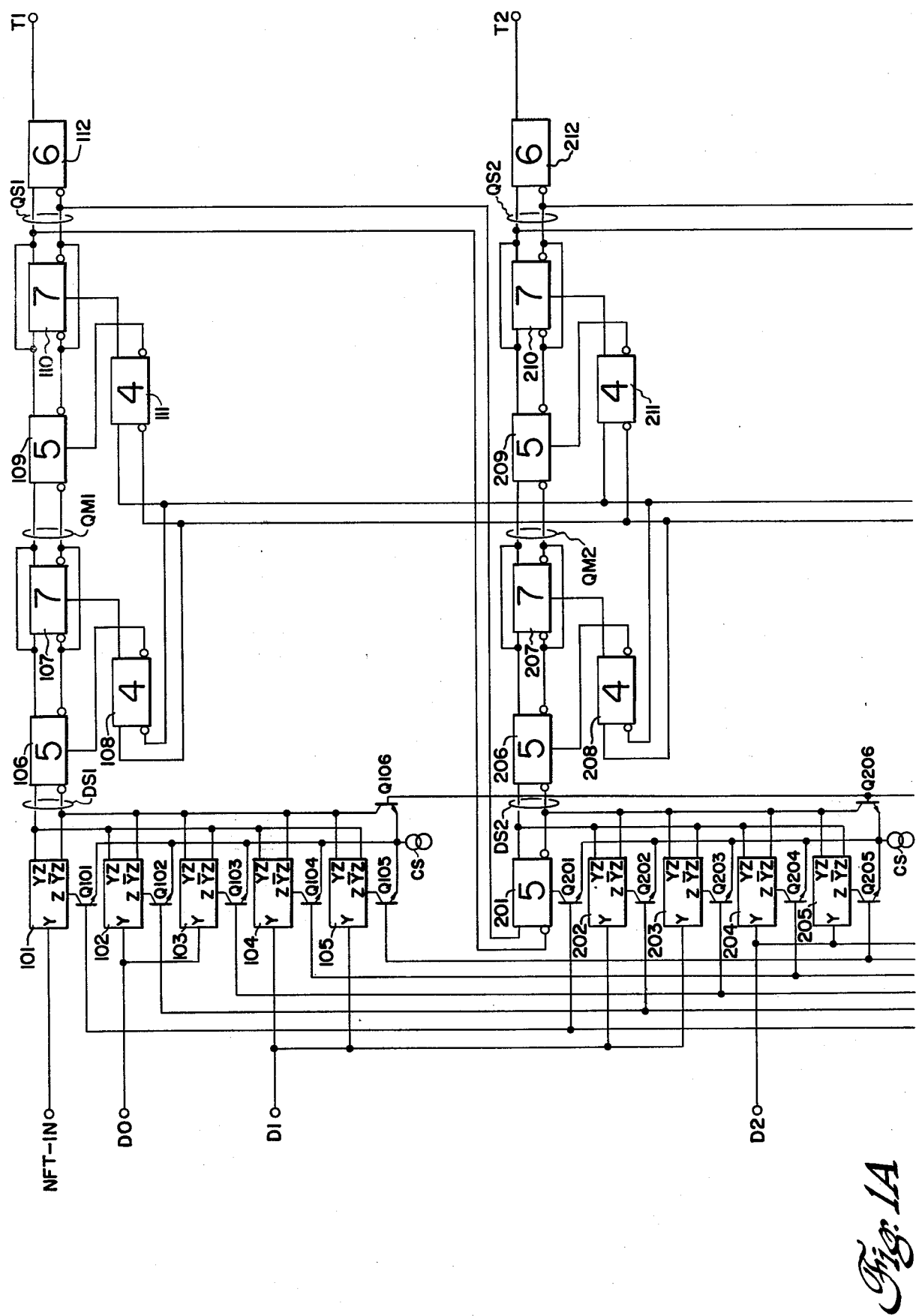
FIGS. 1A–1C show a combination block/circuit diagram illustrating a preferred embodiment of the improved current mode multiple-generating register of the present invention.
Figure 1B:
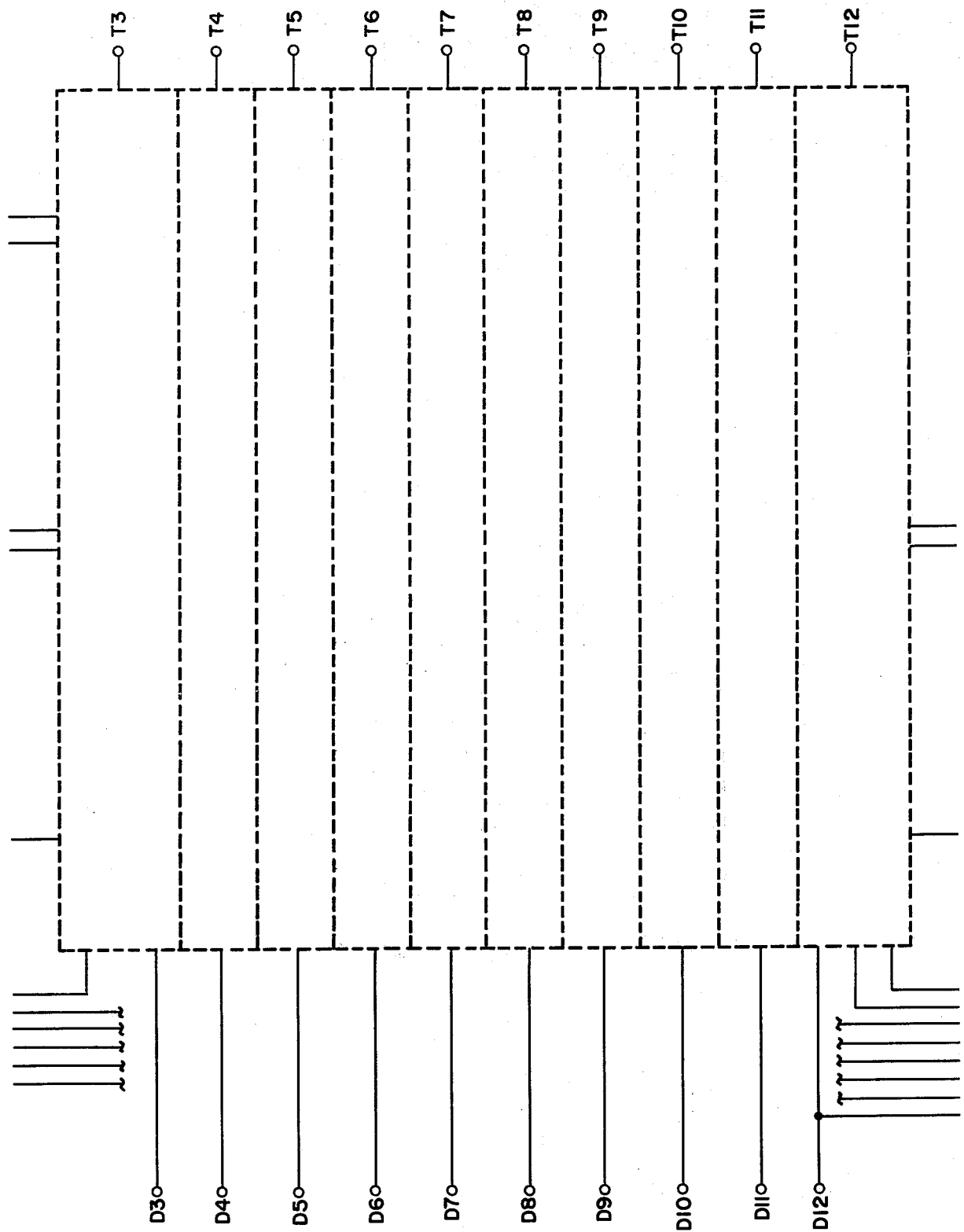
Figure 1C:
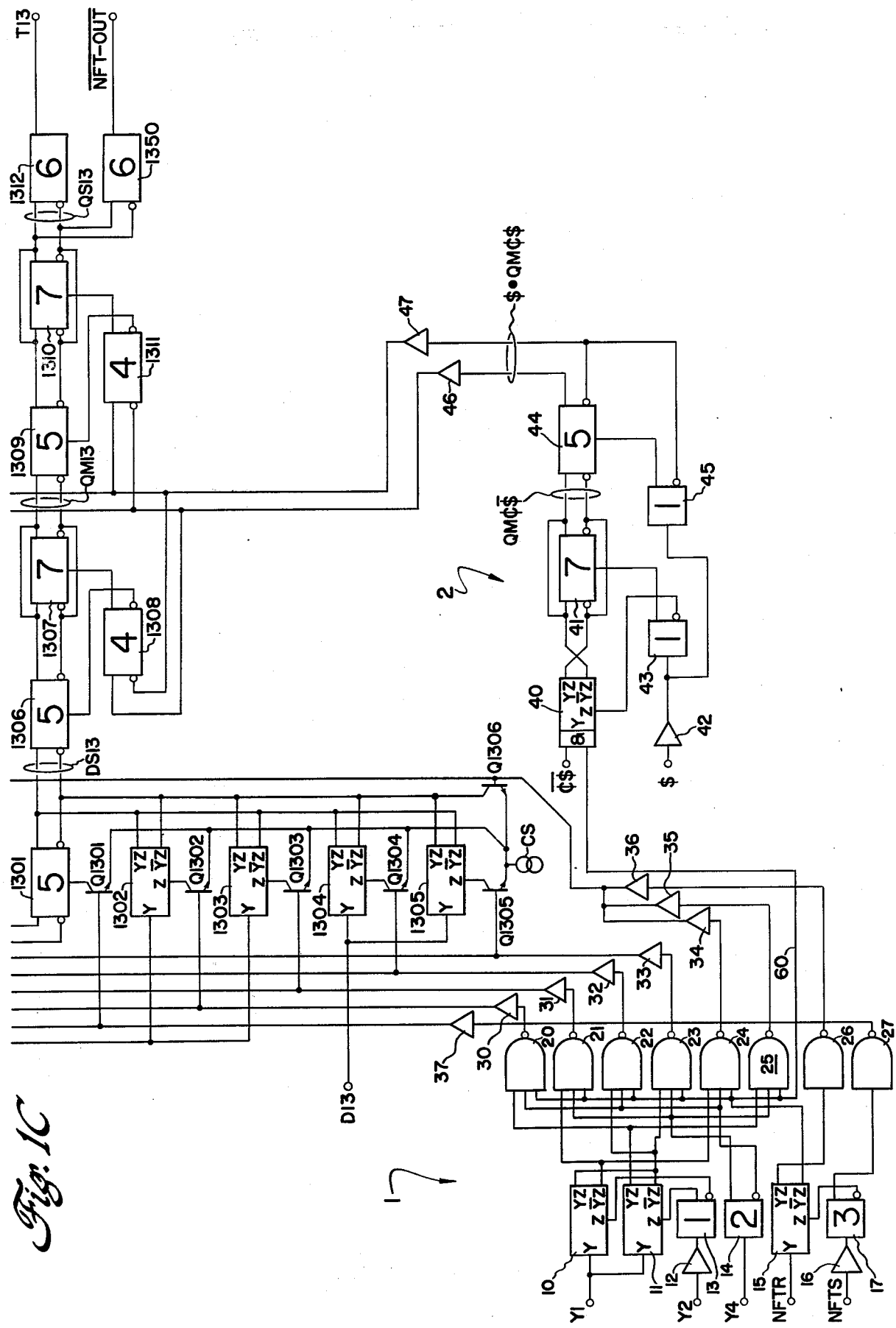
Figure 2A:
Figure 2B:
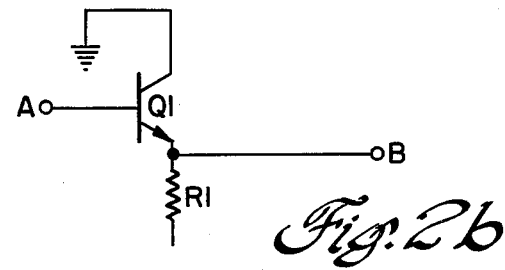

Referring now to FIG. 1, a combination block/circuit diagram of the improved current mode multiple-generating register is shown. The register comprises a control circuit indicated generally by reference numeral 1 in FIG. 1C, a clock circuit 2 indicated generally by reference numeral 2 in FIG. 1C, a plurality of input terminals D0–D13, a plurality of data selectors 101–105, 201–205, . . . , 1301–1305, a plurality of "master" registers 107, 207, . . . , 1307, a plurality of "slave" registers 110, 210, . . . , 1310, and a plurality of output buffers 112, 212, . . . , 1312, each of which has a respective output terminal T1–T13. For the non-functional testing configuration of the register, an NFT-IN input is provided to data selector 101, and an NFT-OUT output is provided from slave register 1310.

Before proceeding with a further discussion of the detailed operation of the present invention, it will be appropriate at this point to discuss the structure and operation of the individual circuit components illustrated in FIGS. 2–13. FIG. 2a is the symbol of an emitter follower having an input A and an output B, and which is used in the present invention to buffer circuit outputs as well as to provide voltage translation, shifting the voltage applied at input A down by 0.8V at the output B. FIG. 2b shows the equivalent electrical circuit, wherein the input A is applied to the base of transistor Q1, and the output B is taken at the common terminal of resistor R1 and the emitter of transistor Q1.

Figure 3A:
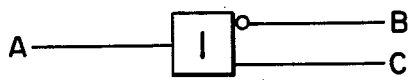
Figure 3B:
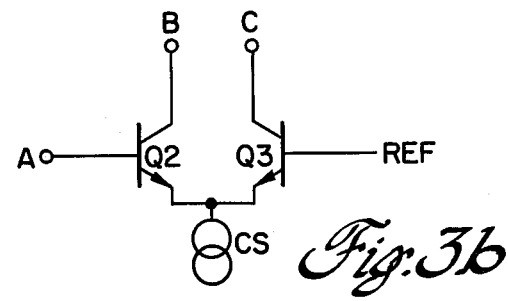
Figure 4A:
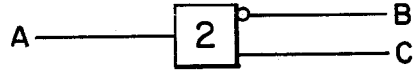
Figure 4B:
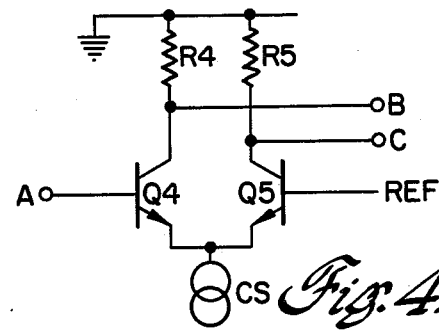
Figure 5A:
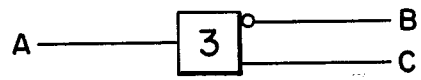
Figure 5B:
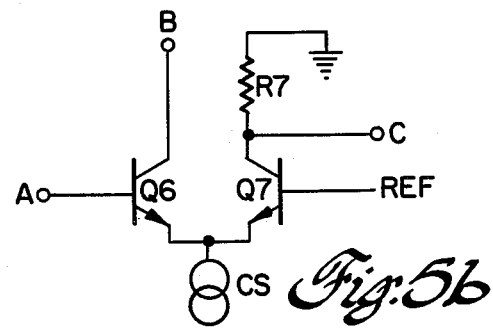

FIGS. 3a–5a illustrate the symbol for a lower level gate, which gate may be implemented in any of the three ways illustrated in FIGS. 3b–5b, depending upon whether the outputs of the lower level gate drive an upper level gate or not. The lower level gate has an input A, a true output C and a complement output B. In FIG. 3b the A input is applied to the base of transistor Q2, and a reference voltage of $0.26 + 0.8 = 1.06$ volts is applied to the base of transistor Q3. The true or C output is taken from the collector terminal of transistor Q3, and the complement or B output is taken from the collector of transistor Q2. With NPN bipolar transistors a binary 0 at input A in the form of a 0V signal causes conduction of transistor Q2 and non-conduction of transistor Q3, so that a binary 0, representing the absence of current, is generated over the output C and a binary 1, representing the presence of current, appears at output B. Conversely, a binary 1 at input A renders transistor Q2 non-conductive and transistor Q3 conductive, thereby generating a binary 0 at output B and a binary 1 at output C. When either or both of the outputs B and C of the lower level gate are used to drive an upper level gate, such as that illustrated in FIGS. 7, 8, or 10, the resistor is eliminated from the corresponding leg of the output portion of the lower level gate. Thus, the circuit illustrated in FIG. 3b, whose outputs are both used to drive upper level gates, has no resistors in the output legs. Since neither of the outputs of the circuit shown in FIG. 4b is used to drive an upper level gate, resistors R4 and R5 appear in both output legs of the circuit. Regarding the circuit shown in FIG. 5b, the B output drives an upper level gate, whereas the C output does not drive an upper level gate.

Figure 6A:
Figure 6B:
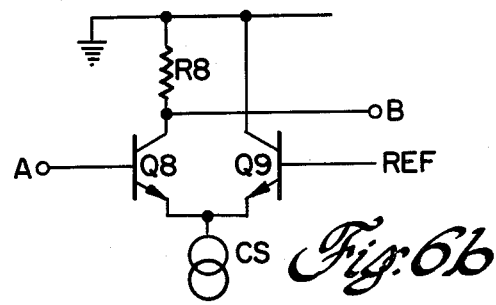

FIG. 6a shows the logic symbol for an inverter having an input A and an inverting output B. Referring to FIG. 6b, when a binary 1 in the form of a −0.5V (assuming a negative logic convention) appears on input A at the base of transistor Q8, Q8 is turned off, and a 0V signal representing a binary 0 appears at the output B. Conversely, when input A is a binary 0, Q8 turns on, and the voltage at output B is −0.5V representing a binary 1.

Figure 7A:
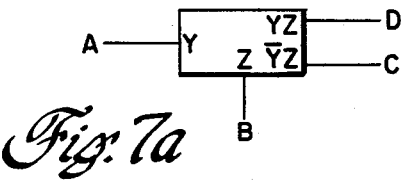
Figure 7B:
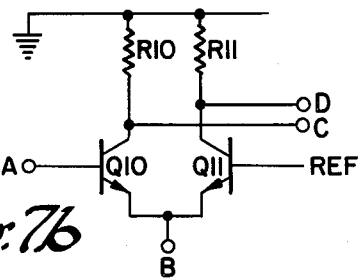

FIG. 7a shows the symbol for a two-input upper level gate having inputs A and B applied to terminals Y and Z, respectively, and producing Y.Z and $\overline{Y.Z}$ outputs over lines D and C, respectively. In the equivalent electrical schematic of FIG. 7b input A is applied to the base of transistor Q10, and input B is applied to the common terminal of the emitters of transistors Q10 and Q11. A reference voltage of −0.26V is applied to the base of transistor Q11, and the collectors of transistors Q10 and Q11 are connected through resistors R10 and R11, respectively, to ground. The C output is taken at the collector of transistor Q10, and the D output is taken at the collector of transistor Q11. The upper level gate shown in FIG. 7 is modified slightly when its outputs feed a differential upper level gate, such as that shown in FIG. 10. In this case, the values of resistors R10 and R11 are cut in half in order that the output voltage representing a binary 1 be −0.25V instead of −0.5V.

Figure 8A:
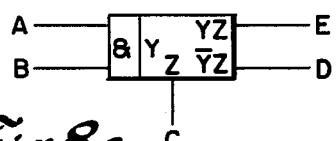
Figure 8B:
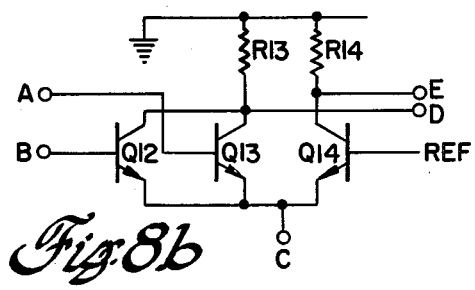

The upper level gate shown in FIG. 8a is similar in function to that shown in FIG. 7a, the Y variable here being the AND function of inputs A and B and the C function being the input C. Thus, output E equals A.B.C and output D equals $\overline{A.B.C}$. With reference to the equivalent electrical schematic shown in FIG. 8b, the A and B inputs are applied to the bases of transistors Q13 and Q12, respectively. The C input is applied to the common terminal of the collectors of transistors Q12 and Q13, and the E output is taken at the collector of transistor Q14. For current to flow through the E output, inputs A and B must both be a binary 1 in the form of a −0.5V signal, thus rendering transistor Q14 conductive, and input C must be present. Otherwise, if either of the A or B inputs are a binary 0 (OV) and the C input is present, current will flow through output terminal D.

The upper level gate of FIGS. 7 and 8 are used in combination with the lower level gates shown in FIGS. 3 and 5. As described previously, the reference voltage for the upper level gates is −0.26V, and the logic inputs are either OV or −0.5V. The output voltage swings between 0 and −0.5V in the normal situation, but it swings between 0 and −.25V when the upper level gate feeds a differential upper level gate such as that shown in FIG. 10. Since the inputs to the lower level gates are derived from emitter followers, the consequent 0.8 voltage translation necessitates a reference voltage of −1.06V for the lower level gates.

Figure 9A:
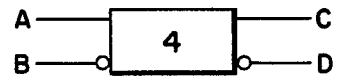
Figure 9B:
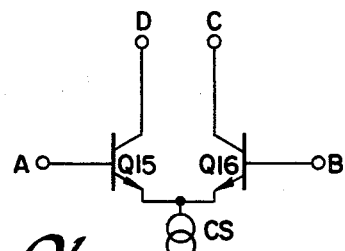

FIG. 9a shows the logic symbol for a differential lower level gate. The differential lower level gate receives as inputs signals A and B of opposite polarity and generates as outputs signals C and D, signal C being at the same level as input signal A, and signal D being at the same level as input B. FIG. 9b shows the circuit implementation of the differential lower level gate, wherein signal A is applied to the base of transistor Q15, and input signal B is applied to the base of transistor Q16. A current source (i.e., a resistor or transistor) is connected to the common terminal of the emitters of transistors Q15 and Q16. Output signal D is taken from the collector of transistor Q15, and output signal C is taken from the collector of transistor Q16.

Figure 10A:
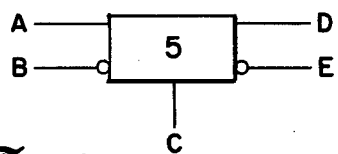
Figure 10B:
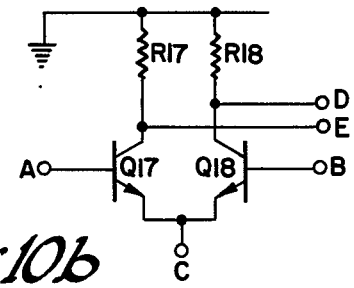

FIG. 10a illustrates the logic symbol for a differential upper level gate having inputs A and B of opposite polarity and enabling input C. Output D is of the same polarity as input A, and output E has the polarity of input B. Referring to the equivalent schematic of FIG. 10b, input A applied to the base of transistor Q17, input B is applied to the base of transistor Q18, input C is applied to the common terminal of the emitters of transistors Q17 and Q18, output D is taken from the junction of resistor R18 and the collector of transistor Q18, and output E is taken from the junction of resistor R17 and the collector of transistor Q17.

Figure 11A:
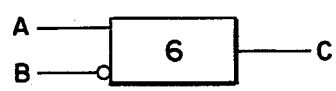
Figure 11B:
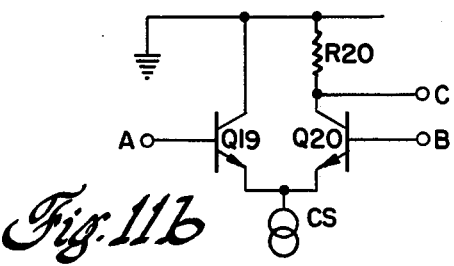

FIG. 11a shows the logic symbol for an output buffer having differential inputs A and B. The output buffer generates a single-valued output signal C of the same polarity as input A. As the equivalent electrical schematic of FIG. 11b illustrates, input A is to the base of transistor Q19, input B is to the base of transistor Q20, current source CS is connected to the common terminal of the emitters of transistors Q19 and Q20, and output C is connected to the junction of resistor R20 and the collector of transistor Q20.

Figure 12A:
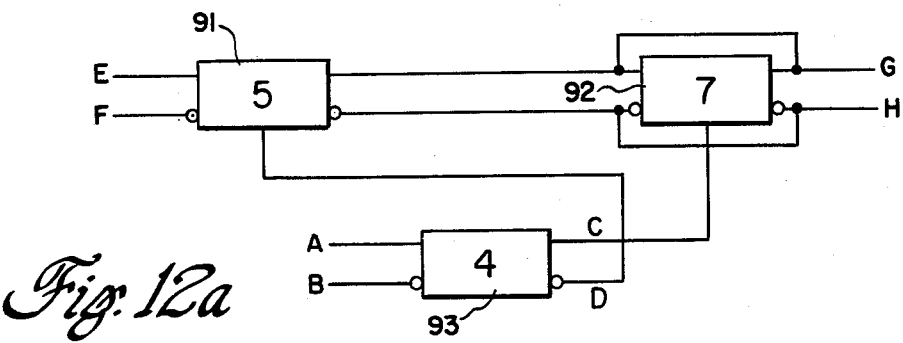
Figure 12B:
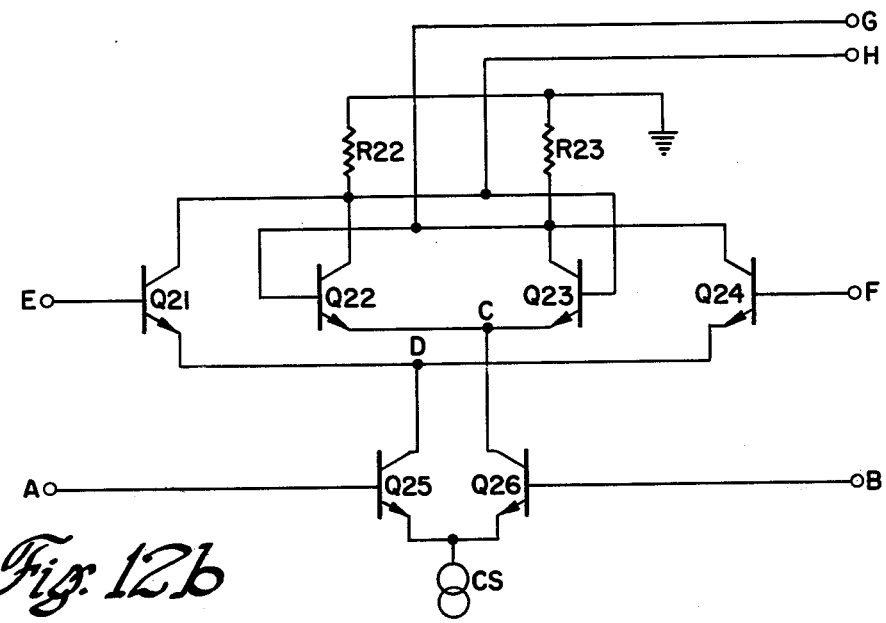

FIG. 12a shows a characteristic grouping of logic gates which appears twice between the input and output terminals of each data stage, in the form of either a master register or a slave register. In this grouping a differential lower level gate 93 controls the operation of two differential upper level gates 91 and 92. The differential lower level gate 93 has a pair of complementary inputs A and B and complementary outputs C and D, respectively. The C output of the differential lower level gate 93 enables differential upper level gate 92, and the D output of the differential lower level gate 93 enables differential upper level gate 91. Differential upper level gate 91 has a pair of complementary inputs E and F and a pair of complementary outputs which serve as the inputs to differential upper level gate 92. Differential upper level gate 92 has a pair of complementary outputs G and H, as well as a pair of feedback lines to its input terminals, which feedback lines serve as a latching mechanism. With reference to the equivalent electrical schematic shown in FIG. 12b, differential lower level gate 93 comprises transistors Q25 and Q26 and current source CS. Input A to differential lower level gate is applied to the base of Q25, while input B is applied to the base of transistor Q26. Differential upper level gate 91 comprises a pair of transistors Q21 and Q24 whose common emitter junction is connected to the collector of transistor Q25, and a pair of resistors R22 and R23 connected to the collector terminals of Q21 and Q24, respectively, and to ground. Input E to differential upper level gate 91 is applied to the base of transistor Q21, while input F is applied to the base of transistor Q24. Differential upper level gate 92 comprises a pair of transistors Q22 and Q23 whose common emitter terminal is connected to the collector of transistor Q26, and whose collector terminals are connected to ground through resistors R22 and R23, respectively. The base of transistor Q22 is connected to the collector of transistors Q24, while the base of transistor Q23 is connected to the collector of transistor Q21. Output G of differential upper level gate 92 is taken from the junction of the collector of transistor Q23 and resistor R23, and output H is taken from the junction of the collector of transistor Q22 and resistor R22.

The operation of the combination of logic gates shown in FIG. 12a is as follows. When A=0 and B=1, then G=E and H=F. This can be shown to be true by the following analysis. When a binary 0 in the form of a OV signal is applied to the base of transistor Q25, Q25 is conductive, and Q26 is non-conductive by virtue of the complementary −0.25V signal applied to its base. If a binary 1 signal, represented by a −0.25V is applied to the base of transistor Q21, and the complementary logic 0 signal is applied to the base of transistor Q24, transistor Q21 is non-conductive and transistor Q24 is conductive. With transistors Q24 and Q25 turned on, a conductive path is formed from current source CS across the emitter-to-collector junctions of Q25 and Q24, across R23 to ground. The potential at the G output is correspondingly −0.25V representing a binary 1. Because transistor Q21 is off, the potential at the H output remains at OV corresponding to a binary 0. When the A and B inputs switch so that A=1 and B=0, transistor Q25 turns off and transistor Q26 turns on. For these values of A and B, the G and H outputs of differential upper level gate 92 remain latched irrespective of the values of E and F into differential upper level gate 91 as the following analysis will show. Assuming the E=1 and F=0 prior to the time when the values of A and B became logical 1 and 0, respectively, the −0.25V potential on the G line is momentarily applied to the base of transistor Q22, keeping such transistor turned off. The OV potential previously existing at the base of transistor Q23 keeps such transistor turned on. Thus, a current path is formed between current source CS across the emitter-to-collector junctions of transistors Q26 and Q23 through resistor R23 to ground. Since transistor Q25 remains non-conductive the values of the E and F inputs to differential upper level gate 91 may change without affecting the G and H outputs of differential upper level gate 92.

Figure 13A:
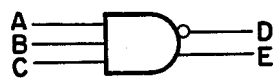
Figure 13B:
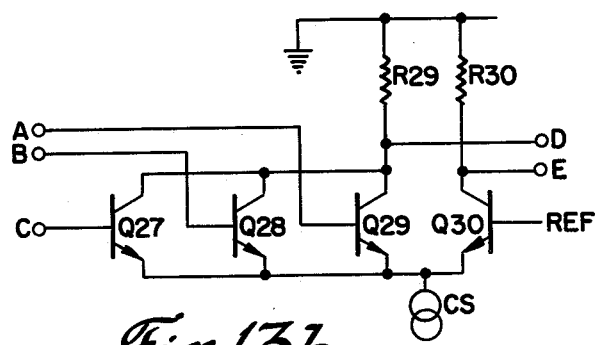

FIG. 13a shows the logic symbol for a three-input NAND gate having a true output E and a complementary output D. The true output E of the NAND gate is a logical 1 whenever any of the inputs is a logical 0, and the true output E becomes a logical 0 only when all three inputs are logical ones. The equivalent electrical circuit is shown in FIG. 13b wherein the collector junctions of transistors Q27–Q29 are connected to ground through resistors R29, and the collector junction of transistor Q30 is connected to ground through resistor R30. The C, B, and A inputs are connected to the base of transistors Q27, Q28, and Q29, respectively. The D output is tied to the common junction of the collector of transistor Q29 and resistor R29. The E output is connected to the common junction of the collector of transistor Q30 and resistor R30.

With these basic functional circuit elements, defined by the logic symbols illustrated in FIGS. 2a–13a and the equivalent electrical schematics illustrated in FIGS. 2b–13b, we will now consider the overall architecture of the improved current mode multiple-generating register of the present invention as illustrated in FIGS. 1A–1C.

Referring now to FIG. 1C, and to control circuit 1 in particular, control circuit 1 comprises a first portion responsive to a 3-bit control signal Y1 Y2 Y4 and a second portion responsive to NFTR (non-functional test reset) and NFTS (non-functional test set) signals. The 3-bit control signal Y1 Y2 Y4 indicates a particular one of several possible multiple-generating mode command signals representing, respectively, ±1, ±2, or 0 times the given input binary number D1–D13. That portion of control circuit 1 which is responsive to 3-bit control signal Y1 Y2 Y4 comprises logic gates 10 and 11, emitter follower 12, inverting/non-inverting lower level gates 13 and 14, and a combinatorial logic network comprising NAND gates 20–25. The output from NAND gates 20–25 in the form of a particular mode command signal is transmitted to emitter followers 30–35. The output of emitter follower 30 is transmitted to the bases of transistors Q102, Q202, ..., Q1302. The output of emitter follower 32 is transmitted to the bases of transistors Q103–Q1303. The outputs of emitter follower 32 is transmitted to the bases of transistors Q104–Q1304. The output of emitter follower 33 is transmitted to the bases of transistors Q105–Q1305. The outputs of emitter followers 34 and 35 are OR'd together and transmitted to the bases of transistors Q106–Q1306.

Control circuit 1 further receives as inputs Non-Functional Test Reset (NFTR) and Non-Functional Test Set (NFTS) signals for configuring the multiple-generating register as an inverting shift register for the purposes of diagnostic analysis of the internal circuit operation. The NFTR signal is input into upper level gate 15 whose YZ output is transmitted through inverter 26 to emitter follower 36, the output of which is OR'd with that from emitter followers 34 and 35 and is transmitted to the bases of transistors Q106–Q1306 as a reset signal. The $\overline{YZ}$ output of upper level gate 15 is transmitted to the combinatorial logic network comprising NAND gates 20–25 and is further transmitted over line 60 as an input to upper level gate 40. The NFTS signal passes through emitter follower 16 to lower level gate 17 whose inverting output is transmitted to upper level gate 15 and whose non-inverting output is transmitted through inverter 27 to emitter follower 37, the output of which is transmitted as a non-functional test signal to the bases of transistors Q101–Q1301.

With reference now to the clock circuit 2, it is responsive to a clock input $ and a clock-enable input $\overline{c\$}$. Clock signal $ is input through emitter follower 42 into lower level gates 43 and 45. Signal $\overline{c\$}$ is input into upper level gate 40. The YZ output of upper level gate 40 is applied to the inverting input of upper level gate 41, and the $\overline{YZ}$ output of upper level gate 40 is applied to the true input of upper level gate 42. The true output of upper level gate 41 is applied to the true input of upper level gate 44, while the inverting output of upper level gate 41 is applied to the inverting input of upper level gate 44. The pair of differential mode output signals from upper level gate 41 is designated as QM¢$. According to the differential mode of operation, a logical "1" or "0" is represented by the differential voltage between two signal lines of 0.25V, the polarity of that differential voltage indicating whether or not a logical "0" or a logical "1" is being transmitted over such signal lines. The true output of upper level gate 44 is transmitted through emitter follower 46 to the true inputs of differential lower level gates 108–1308. The inverting output of upper level gate 44 is OR'd with the inverting output of lower level gate 45 and transmitted through emitter follower 47 to the true inputs of differential lower level gates 111–1311. The differential output of upper level gate 44 is designated as $.QM¢$.

Looking now at FIGS. 1A–1C, a 13-bit binary number is received at input terminals D1–D13 at the multiple-generating register, D1 represents the least significant bit. The DO input is normally zero-valued when the multiple-generating register is used singly, but it represents the highest order input from the next lowest multiple-generating register when two or more such registers are joined together. The DO input terminal is connected to the Y inputs of upper level gates 102 and 103. The D1 input terminal is connected to the Y inputs of upper level gates 104, 105, 202, and 203. The D2 input terminal is connected to the Y inputs of upper level gates 204, 205, 302 (not shown), and 303 (not shown). The D13 input terminal is connected to the Y inputs of upper level gates 1304 and 1305. The NFT-IN input terminal is connected to the Y input of upper level gate 101. The YZ and $\overline{YZ}$ outputs of upper level gates 101–105 are connected to the true and inverting inputs, respectively, of differential upper level gate 106. Logic gates 106, 107, and 108 are identical in structure and operation to logic gates 91–93 described in FIG. 12. The true output of logic gate 107 is connected to the true input of logic gate 109, and the inverting output of logic gate 107 is connected to the inverting input of logic gate 109. Logic gates 109, 110, and 111 are also identical in structure and operation to logic gates 91, 92, 93 shown in FIG. 12. The true output of logic gate 110 is connected to the true input of output buffer 112, and the inverting output of logic gate 110 is connected to the inverting input of output buffer 112.

The outputs from upper level gates 101, 102, ..., 1301 are designated as DS1, DS2, ..., DS13, respectively. The outputs from logic gates 107–1307 are QM1–QM13. The outputs from logic gates 110–1310 are QS1–QS13. Finally, the outputs from output buffers 112–1312 are T1–T13, together representing the desired multiple of the input binary number applied to input terminals D0-D13.

The QS1 outputs from logic gate 110 are connected to the inputs of differential upper level gate 201. Correspondingly, the outputs QS2 from logic gate 210 are connected to the input of differential upper level gate 302. The outputs QS12 from logic gate 1212 (not shown) is connected to the input of differential upper level gate 1301. Finally, the output QS13 from logic gate 1310 is connected to the input of special output buffer 1350, whose true output is labeled $\overline{\text{NFT-OUT}}$.

The emitters of switching transistors Q101-Q106 are connected to current source CS. The collectors of transistors Q101-Q105 are connected to the Z inputs of upper level gate 101-105, respectively, while the collector of switching transistor Q106 is connected to the inverting input of differential upper level gate 106. Transistors Q201-Q206, Q301-Q306, etc. are similarly connected. It should be noted that where the outputs of gates 101-105, 201∝205, etc. are wired together a common resistor is shared.

The signal levels within the improved current mode multiple-generating register may conveniently be represented by logic equations.

The input DSi into any given slave register circuit 106-1306 for any given input binary bit Di is defined by the following logic equation:

$$DSi = [Di-1 \cdot \overline{y4} \cdot y2 \cdot y1 + \overline{Di-1} \cdot y4 \cdot \overline{y2} \cdot y1$$
$$+ Di \cdot (\overline{y4} \cdot \overline{y2} \cdot y1 + \overline{y4} \cdot y2 \cdot \overline{y1})$$
$$+ \overline{Di} \cdot (y4 \cdot \overline{y2} \cdot y1 + y4 \cdot y2 \cdot \overline{y1})] \, \overline{(NFTR \cdot NFTS)}$$
$$+ \overline{QSi-1} \cdot NFTS$$

for = 0, 1, ..., 12

The output QMi of any given master register 107-1307 is defined by the following logic equation:

$$QMi = \$ \cdot QM¢\$ \cdot QMi + \overline{(\$ \cdot QM¢\$)} \cdot DSi$$

The master clock-enable output QM¢$ is defined by the following equation:

$$QM¢\$ = \$ \cdot QM¢\$ + \overline{\$}(¢\$ + NFTR + NFTS)$$

The output QSi of any given slave register 110-1310 is defined by the following logic equation:

$$QSi = \overline{(\$ \cdot QM¢\$)} \cdot QSi + \$ \cdot QM¢\$ \cdot QMi$$

The output Ti of any given output buffer 112-1312 is defined by the following logic equation:

$$Ti = QSi$$

Finally, the NFT special input and output are defined by the following logic equations:

$$\text{NFT-In} = \overline{QS_{13}} \text{ of next lowest order device}$$
$$\overline{\text{NFT-OUT}} = \overline{QS_{13}}$$

The next states QSi' and $\overline{QSi'}$ of the true and complement outputs of the slave registers 110-1310 are defined in terms of the falling edge of the clock $, clock enable ¢$, control signals Y4, Y2, Y1, NFTR, NFTS, the data input signals Di, and the current states QSi and $\overline{QSi}$ by means of the following state table:

STATE TABLE

| $ | ¢$ | Y4 | Y2 | Y1 | NFTR | NFTS | QSi' (Next State) | $\overline{QSi'}$ |
|---|----|----|----|----|------|------|-------------------|-------------------|
| 1 | 1  | X  | X  | X  | 0    | 0    | QSi               | $\overline{QSi}$  |
| 1 | 0  | 0  | 0  | 0  | 0    | 0    | 0                 | 1                 |
| 1 | 0  | 0  | 0  | 1  | 0    | 0    | Di                | $\overline{Di}$   |
| 1 | 0  | 0  | 1  | 0  | 0    | 0    | Di                | $\overline{Di}$   |
| 1 | 0  | 0  | 1  | 1  | 0    | 0    | Di-1              | $\overline{Di-1}$ |
| 1 | 0  | 1  | 0  | 0  | 0    | 0    | $\overline{Di-1}$ | Di-1              |
| 1 | 0  | 1  | 0  | 1  | 0    | 0    | $\overline{Di}$   | Di                |
| 1 | 0  | 1  | 1  | 0  | 0    | 0    | $\overline{Di}$   | Di                |
| 1 | 0  | 1  | 1  | 1  | 0    | 0    | 0                 | 1                 |
| 1 | X  | X  | X  | X  | 1    | 0    | 0                 | 1                 |
| 1 | X  | X  | X  | X  | X    | 1    | $\overline{QSi-1}$ | QSi-1            |

Note: The "Don't Care" condition is represented by "X".

From an analysis of the state table, it will be seen that the clock $ is enabled by the clock-enable ¢$ signal or the NFTR or NFTS signals. If the clock-enable ¢$ signal is a logic 0, and neither NFTR nor NFTS is enabled (i.e., a logical 1), the desired multiple of the data input signals Di is determined by the status of the 3-bit Y1 Y2 Y4 control signal and is transferred to the Ti output terminals on the falling edge of the clock $ (i.e., when the clock signal $ changes from a logical zero to a logical one).

In the case where NFTR is enabled (i.e., a logic one) and NFTS is not enabled, the signal at each output terminal Ti is set to a logic zero on the falling edge of the clock $.

In the case where NFTS is enabled, the multiple-generating register is configured as a 13-bit shift register with inversion between each bit. Data is shifted one bit position for each falling edge of the clock $. The input to the first bit is provided by NFT-IN, and the output from the last bit appears at the $\overline{\text{NFT-OUT}}$ terminal. The non-functional testing configuration enables the individual shift registers in the present invention to be analysed. For example, if the NFT-IN signal is a binary one and the NFTS signal is enabled, after i = 13 clock pulses, the $\overline{\text{NFT-OUT}}$ signal will be a binary zero, assuming proper operation of all internal registers. The outputs at the $\overline{\text{NFT-OUT}}$ terminal will be a series of binary ones and zeroes until the ith clock pulse, when a binary zero appears. Should the $\overline{\text{NFT-OUT}}$ output at any point deviate from this pattern, as for example after n clock pulses, it can be assumed that the cause of the failure occurred in the register located n registers distant from the $\overline{\text{NFT-OUT}}$ output terminal.

It will be apparent to those skilled in the art that the disclosed improved current mode multiple-generating register may be modified in numerous ways and may assume many embodiments other than that specifically set out and described above.

Accordingly, it is intended by the appended claims to cover all modifications of the invention which fall within the true spirit and scope of the invention.

What is claimed is:

1. An improved current mode muliple-generating register for generating multiples of a first binary number which is input thereto, said register being provided with non-functional test (NFT) capabilities, said register comprising:
   a control circuit comprising a first portion responsive to a 3-bit control signal Y1 Y2 Y4 and a second portion responsive to a first control signal NFTR and to a second control signal NFTS;
   a clock circuit responsive to a clock signal $ and to a clock-enable signal ¢$;

a plurality of data stages, each of which is responsive to a respective bit of said first binary number, each of said data stages further comprising
 a data selector circuit responsive to said respective bit of said first binary number and further responsive to said control circuit,
 a master/slave register, said master/slave register being responsive to said clock circuit and further responsive to said data selector circuit, and
 an output buffer circuit responsive to said master/slave register,
whereby said plurality of data stages generate a second binary number which is a multiple of said first binary number in response to said 3-bit control signal.

2. The improved current mode multiple-generating register recited in claim 1 and further comprising
 means or providing an NFT-IN signal to the data selector circuit of the first of said plurality of data stages:
 means for connecting the output of the master/slave register of the last of said plurality of data stages to an additional output buffer circuit for providing an $\overline{\text{NFT-OUT}}$ signal; and
 means for connecting the outputs of all of said master/slave registers except for said last master/slave register with the data selector circuit of the immediately succeeding data stage, said connections being such that the NFT-IN signal which is input to said first data selector circuit is inverted in each successive data stage.

3. The improved current mode mulitple-generating register recited in claim 2, wherein each of said data selector circuits further comprises:
 a current source;
 a first pair of single input upper level gates responsive to the respective bit of said first binary number for providing a differential output signal depending upon the state of said respective bit, said first pair of single input upper level gates being connected to a first pair of current switching means, said first pair of current switching means being responsive to said 3-bit and NFTS control signals for enabling said first pair of single input upper level gates; and
 a second pair of single input upper level gates, said second pair of single input upper level gates being responsive to the next higher order input bit, and providing a differential output signal depending upon the state of said next higher order input bit, said second pair of single input upper level gates being connected to a second pair of current switching means, said second pair of current switching means being responsive to said 3-bit NFTR control signals or enabling said second pair of single input upper level gates.

4. The improved current mode multiple-generating register recited in claim 3 and further comprising
 a fifth single input upper level gate in first data selector circuit responsive to said NFT-IN signal for providing a differential output signal dependent on the state of said NFT-IN signal;
 a differential upper level gate in each of said data stages with the exception of said first data stage, said differential upper level gate being responsive to the output of said master/slave register of the preceding data stage and generating a differential output;
 fifth current switching means responsive to said NFTS signal for enabling said differential upper level gate;
 sixth current switching means responsive to said NFTS signal for enabling said fifth single input upper level gate;
 first means in said first data stage for connecting the output of said fifth signal input upper level gate to the outputs of said first and second pairs of single input upper level gates of said data selector circuit;
 second means in each of the remaining ones of said data stages for connecting the outputs of said first and second pairs of single input upper level gates to the outputs of said differential upper level gates; and
 seventh current switching means in each of said data selector circuits, said seventh current switching means being responsive to said NFTR signal for generating a logical "O" signal at the output of each of said data selector circuits.

5. The improved current mode multiple-generating register recited in claim 2, wherein each of said master/slave registers comprises:
 first, second, third, and fourth differential upper level gates, and first and second differential lower level gates, said first differential lower level gate having its inverting output connected to said first differential upper level gate and its non-inverting output connected to said second differential upper level gate, said second differential lower level gate having its inverting output connected to said third differential upper level gate and its non-inverting output connected to said fourth differential upper level gate; and
 means for connecting the outputs of said data selector circuit to the inputs of said first differential upper level gate, said outputs of said first differential upper level gate being connected to the inputs of said second differential upper level gate, the output of said second differential upper level gate being connected both to the input thereto and to the input of said third differential upper level gate, the output of said third differential upper level gate being connected to the input of said fourth differential upper level gate, and the output of said fourth differential upper level gate being connected both to the input thereto and to the input of said output buffer circuit.

6. The improved current mode multiple-generating register recited in claim 1, wherein said control circuit further comprises:
 a decoding section responsive to said NFTR and said NFTS signals for providing a reset signal, a nonfunctional test signal, and one of a plurality of mode command signals to each of said data selector circuits, and
 wherein said clock circuit is responsive to said NFTR signal, said ¢$ signal, and said $ signal for providing a signal S·QM¢$ to each of said master/slave registers.

* * * * *